Aug. 25, 1953 — L. HORNBOSTEL — 2,649,719
SUCTION ROLL SEAL ASSEMBLY
Filed April 27, 1949
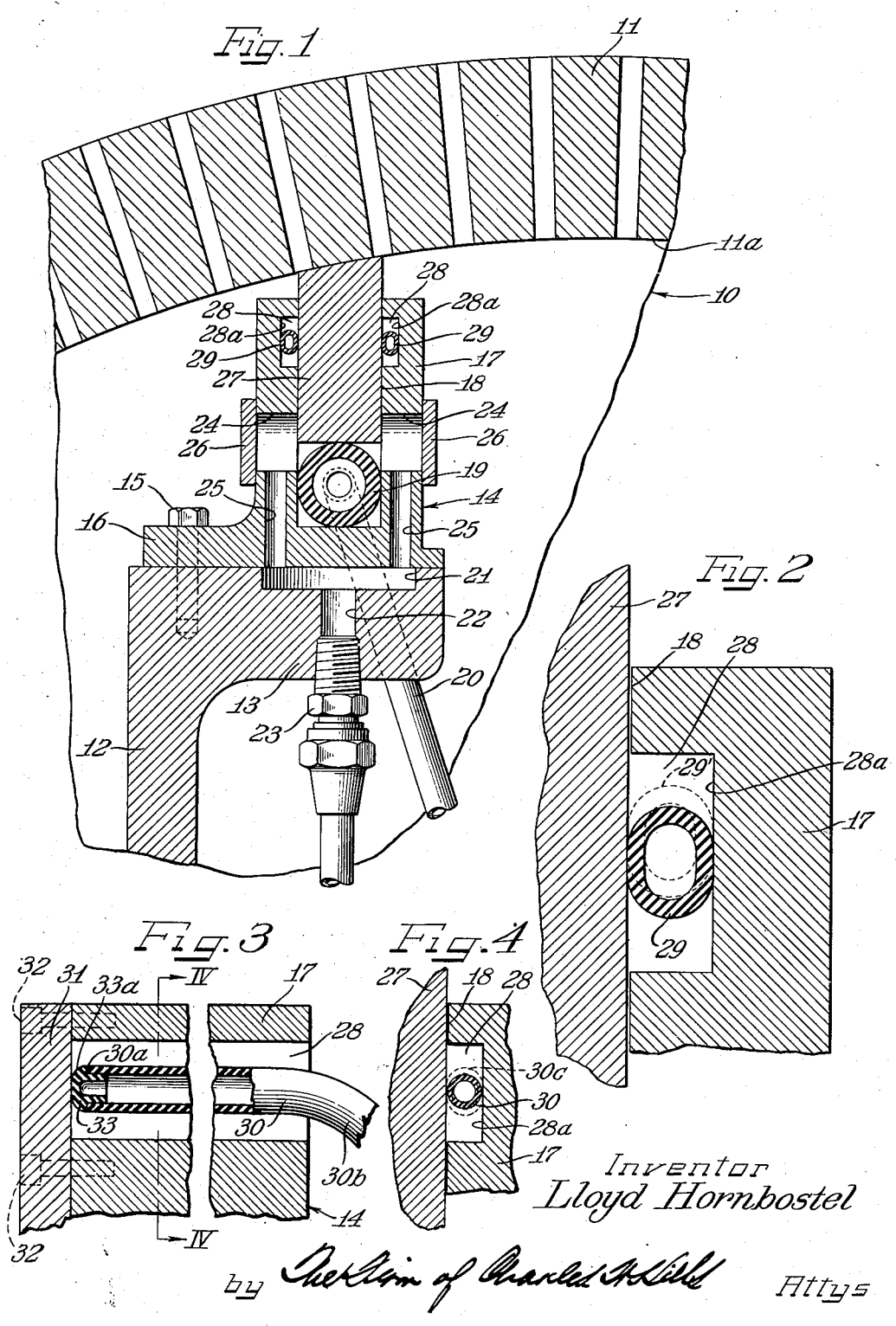
Inventor
Lloyd Hornbostel Patented Aug. 25, 1953

2,649,719

UNITED STATES PATENT OFFICE 2,649,719

SUCTION ROLL SEAL ASSEMBLY

Lloyd Hornbostel, Beloit, Wis., assignor to Beloit Iron Works, Beloit, Wis., a corporation of Wisconsin Application April 27, 1949, Serial No. 89,839

7 Claims. (Cl. 92—53)

The present invention relates to a suction roll assembly and more particularly to a seal assembly for employment in suction rolls, such as those used in paper machinery, the seal assembly permitting rolling contact between parts of the assembly.

Suction rolls typically include an outer, radially perforated, cylindrical shell journaled for rotation about its longitudinal axis and a stationary suction box or gland extending axially of the shell. The suction gland carries sealing strips extending into sealing contact with the inner periphery to define the limits of the suction area of the roll.

Even though the roll is carefully made and machined, some eccentricity will exist between the shell and the suction gland, and to prevent leakage this eccentricity must be compensated for by movement of the sealing strips relative to the suction gland. Since the sealing strips should move freely to follow the contour of the inner wall of the shell, they cannot have a tight fit in the gland, and additional sealing means are required to stop leakage between the strips and the gland.

The sealing means of the present invention includes a pair of hollow sealing tubes acting upon the side faces of the sealing strip and bottomed in grooves formed in the gland housing for the strip that are too shallow for freely receiving the tubes but are wider than the tubes. The sealing tubes are normally of circular cross-section and are so confined between the bottoms of the grooves and the sealing strip that they are deformed under compressive stress from this normally circular cross-section. The resiliency of the sealing tube and the width of the grooves permits relatively large tolerances in the manufacture of the seal assembly without impairing the sealing function of the tube.

Alternatively, the tubes may be sized so that in their free state they are bottomed snugly within the grooves and against the sealing strip without substantial deformation, the desirable tube deformation being caused after assembly by inflation of the tubes. In this manner, tight sealing engagement between the tube, the groove bottom and the strip is insured.

The tubes are preferably coextensive in length with that of the sealing strip and, due to their curved periphery and the oversize width of the grooves, are in rolling contact with both the sealing strip and the housing, thus accommodating relative movement between the sealing strip and its housing without causing undue wear of the sealing strip. In addition, each of the sealing tubes is self-centering within its associated groove.

It is, therefore, an important object of the present invention to provide an improved suction roll seal assembly for effectively sealing a sealing strip within its associated gland housing despite eccentricity of the suction roll shell and the suction roll gland.

Another important object of the present invention is to provide a suction roll seal assembly in which a resiliently deformable sealing tube is employed to seal a sealing strip within its housing while permitting movement of the sealing strip relative to the housing.

Still another important object of the present invention is to provide sealing means for disposition within a gland housing for the sealing strip of a suction roll, the sealing means preventing leakage around the sealing strip and the entrance of foreign material into the suction gland while permitting relative movement of the strip and its housing.

It is a further important object of the present invention to provide an improved suction roll seal including a pair of inflated tubes contacting opposing side surfaces of a sealing strip and bottomed against an adjacent portion of a housing for the strip to accommodate by rolling action shifting of the strip within its housing during rotation of the roll.

Other and further important objects of the present invention will become manifest to those versed in the art from the following detailed description and from the accompanying drawings and the numerals of reference marked thereon.

In the drawings:

Figure 1 is a fragmentary vertical sectional view of a suction roll seal assembly of the present invention;

Figure 2 is an enlarged, fragmentary sectional view of a portion of the assembly of Figure 1;

Figure 3 is a fragmentary, longitudinal sectional view of a modified seal assembly of the present invention; and Figure 4 is a sectional view taken along the plane IV—IV of Fig. 3.

As shown on the drawings:

As shown in Figure 1, reference numeral 10 refers generally to a suction roll for a paper making machine or the like, including a radially perforated, generally cylindrical exterior shell 11 journaled for rotation about its longitudinal axis. Reference numeral 12 refers to one wall of a conventional suction box or gland extending axially of the shell 11 and having an inwardly directed flange 13 extending toward a similar opposite flange (not shown) of the suction gland. The space between these two flanges forms the inlet opening to the interior of the gland.

A sealing strip holder, indicated generally at 14, is secured to the upper surface of flange 13 by suitable means, as by means of bolts 15 extending through a flange 16 formed integrally with the holder 14 into threaded engagement with flange 13. The holder 14 is provided with an outwardly directed upstanding rib 17 having a central slot 18 of rectangular cross-section extending inwardly of the rib toward the gland flange 13. An inflatable tube-type bladder 19 formed of suitable material, such as rubber or expandible plastic tubing, is bottomed in the slot 18, the bladder 19 being connected by suitable means, as by tube 20, to a source of fluid, such as air, under pressure.

The upper surface of the gland flange 13 is provided with an elongated recess 21 extending along the length of the flange, and the recess 21 communicates with a source of liquid under pressure through a bore 22 coupled to a liquid supply tube 23. The upstanding rib 17 is provided with a plurality of transverse bores 24 intermediate its length, and each of the bores 24 communicates with the recess 21 through a pair of aligned apertures 25 formed in the holder 14 on each side of the slot 18. Each end of the transverse bores 24 is closed by a closure plate 26 to provide passages joining the tube 23 with the slot 18.

A sealing strip 27 is mounted in the slot 18 and extends beyond the upstanding rib 17 into surface engagement with the inner periphery 11a of the rotatable, perforated shell 11. The sealing strip 27 may be formed of various suitable materials, preferably of a graphite impregnated phenolic or other type resin. The sealing strip processes sufficient rigidity so as not to require a metal jacket or other stiffening means, particularly since the upstanding rib 17 extends into closely spaced relation with the interior inner periphery 11a of the shell 11. It will be appreciated that the sealing strip 27 is coextensive with the length of the suction area to be defined upon the rotatable shell 11 and that the upstanding rib 17 is in turn coextensive with the sealing strip.

The sealing means of the present invention includes a pair of elongated, opposed grooves 28 formed in the housing rib 17, one recess being provided on each side of the sealing strip 27 and in full communication with the slot 18 throughout the entire length of the slot.

A sealing tube 29 is provided in each of the grooves 28, the tube 29 normally being of circular cross-section, but since the groove 28 is of less depth than the diameter of the tube and since the strip 27 covers the groove, the tube is flattened into a generally elliptical cross-sectional shape. The grooves 28 are wider than the tubes 29 so that the flattened tubes are free to roll in the grooves.

In Figure 2 it may be seen that the sealing tube 29 is flattened between the opposing side wall of the sealing strip 27 and the bottom wall 28a of the groove 28. Although the tube 29 is deformed, it still has a generally curved outer contour and is adapted to roll along the opposed wall 28a of the groove 28 and the adjacent side wall of the strip 27.

The operation of the assembly of the present invention hereinbefore described will be appreciated by those skilled in the art. Thus, the sealing strip 27 is urged into surface engagement with the inner periphery 11a of the rotatable shell 11 by the inflated bladder 19.

Liquid introduced into the recess 21 of the flange 13 through the tube 23 flows through the transverse bores 24 and, due to the operational clearance between side walls of the slot 18 and the side walls of the strip 27, as shown in Figure 2, liquid may pass into the grooves 28. Due to the sealing engagement of the resilient sealing tubes 29 with the bottom walls 28a of the grooves and with the adjacent side walls of the sealing strip 27, any liquid bleeding into the grooves cannot leak past the sealing tubes 29. However, liquid pressure within the grooves 28 does aid the tubes 29 in preventing the passage of any foreign material, such as fibers from a paper web contacting the outer periphery of the shell 11.

Each tube 29 is capable of relative rolling movement within its groove 28 and, upon the rotation of the slightly eccentric shell 11 about the suction gland, the sealing strip 27 will be capable of free sliding movement within its slot 18. It is not necessary in assembling the sealing strip 27 within the assembly to center the tube 29 within its groove 28 since the range of movement of the tube in its groove is limited by the upper and lower ends of the groove, and if the strip continues to move after the tube reaches the end of its travel, the tube may not roll but will not stop movement of the strip. Then when the strip moves in the reverse direction it will roll the tube away from the end of the groove. Upon the completion of a relatively few revolutions of the shell 11, the tube 29 will become automatically centered within the groove. In Figure 2, an alternative position of the tube 29 is indicated in dotted outline and it will be readily understood that this dotted position, while merely indicative of an alternative position of the tube 29, illustrates the rolling action of the tube within its groove.

In the modified form of the invention shown in Figs. 3 and 4, reference numerals identical with those of Figures 1 and 2 refer to similar portions of the assembly. In Figures 3 and 4 it will be understood that the upstanding rib 17 is part of a holder 14 (not shown) similar to the holder of Fig. 1. The groove 28 is provided in rib 17 as hereinbefore described and a tube 30 is positioned in the groove 28. One end of the groove 28 is closed by a closure plate 31, secured by suitable means, as by screws 32 extending into the rib 17.

That terminal end 30a of the tube 30 adjacent the closure plate 31 is closed by a hollow flexible plug 33 having a rounded end 33a contacting the inner surface of plate 31. The end 33a of plug 33 is in rolling engagement with the plate 33 so that the tube is free to roll in the groove 28 between the groove wall 28a and the strip 27 (Figure 4).

The opposite terminal end 30b of the tube 30 extends freely out of the groove 28 at the end of rib 17 beyond the deckle end closure (not shown) for attachment to a suitable source of fluid, such as air, under pressure. The introduction of air under pressure into the interior of the tube 30 deforms the tube from its free cylindrical cross-sectional shape to the dotted oval, or ellipsoidal contour 30c of Figure 4. The inflation of the tube 30 preserves the curved exterior contour of the tube and insures the sealing contact between the tube 30, the strip 27, and the rib 17. The tube 30 is sufficiently flexible and distortable to allow the securing of the end 30b to a fixed source of fluid under pressure without interfering with rolling movement of the tube in the slot 28, while the contact between the plug 33 and the plate 31 also accommodates this rolling of the tube.

From the foregoing description, the advantages residing in the present invention will be appreciated by those skilled in the art, and the efficient sealing obtained by the employment of the tubes 29 and 30 in resilient sealing engagement between the holder 14 and the sealing strip 27 may be seen. The specific structure of Figures 1 and 2 results in a further improvement in the sealing characteristics of the assembly since the subjection of one side of each of tubes 29 to liquid pressure from the tube 23 lubricates the sliding action of the strip 27 in its slot and the rolling action of the tubes 29 in their grooves, while washing out foreign material that might otherwise work down between the strip and slot. A slight bleeding of liquid out of the top of the slot 18 may sometimes be desirable.

It will of course be understood that various details of construction may be varied through a wide range without departing from the principles of this invention and it is, therefore, not the purpose to limit the patent granted hereon otherwise than necessitated by the scope of the appended claims.

I claim as my invention:

1. A suction roll seal assembly comprising a sealing strip holder for connection to a suction gland and extending into closely spaced relation to the inner periphery of a rotatable perforated shell, a sealing strip mounted in said holder and capable of movement relative thereto, inflatable means carried by said holder for urging said sealing strip into surface engagement with the inner periphery of said rotatable shell, and a sealing tube of originally circular configuration resiliently confined between said sealing strip holder and said sealing strip and deformed therebetween into a generally oval configuration into rolling engagement therewith to accommodate relative movement of said sealing strip and said holder while preventing fluid leakage therebetween.

2. In a suction roll for a paper making machine having a rotatable perforated shell and a suction gland mounted interiorly of said shell, a seal assembly comprising a sealing strip holder carried by said gland and extending outwardly therefrom toward said shell and having a slot formed therein opening outwardly toward said shell, a sealing strip mounted in said slot and capable of relative movement therein, means mounted in said slot for urging said sealing strip into sealing engagement with the inner periphery of said rotatable shell, and sealing tubes of annular cross-sectional configuration mounted in said holder in rolling contact with opposing side surfaces of said sealing strip, said tubes being deformed from their original configuration into fluid-tight extended surface engagement with both said holder and said strip while still permitting relative movement therebetween by rolling movement of said tubes.

3. In a suction roll for a paper making machine having a rotatably disposed, generally cylindrical perforated shell and a suction gland extending axially of said shell, means for sealing off an area between said gland and said shell including a sealing strip holder carried by said gland and having a slot opening toward said shell and opposed grooves in said holder registering with said slot, a packing strip slidably mounted in said slot for movement toward and away from said shell, means resiliently urging said packing strip into surface engagement with said shell, and a hollow resilient sealing tube disposed in each groove and deformed between the side of the strip and the bottom of the groove into sealing rolling engagement therewith to prevent the flow of foreign material into the interior of said holder beyond said tubes without interfering with the sliding of the strip in said holder, said tubes each, when deformed, being in extended sealing surface contact with both said strip and said holder and rolling in the grooves to accommodate sliding of the strip.

4. A sealing strip assembly for suction rolls and the like comprising a member having a longitudinally extending slot and additional opposed, longitudinally extending grooves in full communication with said slot, a sealing strip slidably mounted in said slot and extending therefrom to present a sealing face for engagement with a suction roll surface or the like, and a resiliently deformable hollow sealing tube mounted in each of said opposed grooves for resilient sealing engagement with said member and said sealing strip, said grooves being shallower and materially wider than the free diameters of the tubes to flatten the tubes into elliptical shape and to accommodate rolling of the flattened tubes within the grooves upon sliding movement of the strips in the slot for sealing the strip in the slot without interfering with said sliding movement.

5. A sealing strip assembly for suction rolls and the like, comprising a member having a longitudinally extending slot and additional opposed longitudinally extending grooves in full communication with said slot, a sealing strip slidably mounted in said slot and extending therefrom to present a sealing face for engagement with a suction roll surface or the like, and an inflatable hollow sealing tube mounted in each of said opposed grooves for resilient sealing engagement with said member and said sealing strip when said tubes are inflated, said grooves being shallower and materially wider than the free diameters of said tubes when inflated to flatten said inflated tubes into elliptical shape and to accommodate rolling of the flattened tubes for sealing the strip in the slot without interfering with sliding movement of the strip.

6. In a suction drum for a paper making machine having a rotatable, radially perforated cylindrical shell, a suction gland extending longitudinally of said shell parallel to the axis thereof, and an outwardly directed rib carried by said gland to extend into closely spaced relation to the inner periphery of said shell and having a central recess formed therein opening toward said shell, sealing means extending from said rib into engagement with said shell comprising a sealing strip mounted in said rib recess and movable relative to said rib, means urging said strip into resilient sealing engagement with said shell, an inflatable sealing tube coextensive with said sealing strip and confined between said strip and said rib when inflated for rolling engagement with said strip and said rib, and means for inflating said tube without interfering with the rolling action of the tube.

7. In a suction roll for a paper making machine having a rotatably disposed, generally cylindrical perforated shell and a suction gland extending axially of said shell, means for sealing off an area between said gland and said shell including a sealing strip holder carried by said gland and having a slot opening toward said shell and opposed grooves in said slot, a packing strip slidably mounted in said slot for movement toward and away from said shell, means resiliently urging said packing strip into surface engagement with said shell, a hollow inflatable sealing tube disposed in each groove and deformed when inflated between the side of the strip and the bottom of the groove into sealing rolling engagement therewith to prevent the flow of foreign material into the interior of said holder beyond said tubes, means for inflating said tube without interfering with the rolling action of the tubes within said grooves, a closure plate closing one end of each of said grooves, and closure means for an adjacent end of each of said tubes to contact said plate for sealing said tube ends without interfering with the sliding of the strip in said holder.

LLOYD HORNBOSTEL.

References Cited in the file of this patent

UNITED STATES PATENTS

| Number | Name | Date |
|---|---|---|
| 207,871 | Horton et al. | Sept. 10, 1878 |
| 1,679,598 | Berry | Aug. 7, 1928 |
| 1,800,149 | Miller | Apr. 7, 1931 |
| 2,212,588 | Cysanyi | Aug. 27, 1940 |
| 2,290,777 | Street | July 21, 1942 |
| 2,300,385 | Kollberg et al. | Oct. 27, 1942 |
| 2,312,519 | Berry | Mar. 2, 1943 |
| 2,385,627 | Jones | Sept. 25, 1945 |
| 2,447,340 | Jackson | Aug. 17, 1948 |

FOREIGN PATENTS

| Number | Country | Date |
|---|---|---|
| 26,049 | Great Britain | of 1909 |
| 421,020 | France | Feb. 13, 1911 |